United States Patent
Aso (10) Patent No.: US 7,371,476 B2
(45) Date of Patent: May 13, 2008

(54) FUEL CELL SYSTEM AND RELATED CONTROL METHOD

(75) Inventor: Takeshi Aso, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 502 days.

(21) Appl. No.: 10/670,508

(22) Filed: Sep. 26, 2003

(65) Prior Publication Data

US 2004/0076860 A1     Apr. 22, 2004

(30) Foreign Application Priority Data

Oct. 22, 2002  (JP) ............................. 2002-307216

(51) Int. Cl.
*H01M 8/00* (2006.01)
*H01M 8/04* (2006.01)
*H01M 8/12* (2006.01)

(52) U.S. Cl. ............................. 429/12; 429/23; 429/22

(58) Field of Classification Search ................ 429/12, 429/23
See application file for complete search history.

(56) References Cited

U.S. PATENT DOCUMENTS 5,780,980 A * 7/1998 Naito ......................... 318/139
5,998,885 A * 12/1999 Tamor et al. ............... 307/10.1
6,534,208 B1 * 3/2003 Zinser ........................... 429/9
6,580,977 B2 * 6/2003 Ding et al. .................. 701/22

FOREIGN PATENT DOCUMENTS

JP     2001-229943 A    8/2001

* cited by examiner

*Primary Examiner*—Stephen Kalafut
*Assistant Examiner*—Julian Mercado
(74) *Attorney, Agent, or Firm*—Foley & Lardner LLP (57) ABSTRACT

A fuel cell system and a related control method are disclosed wherein, during start-up of a fuel cell stack 1, a controller 21 operates a DC/DC converter 13 in a voltage control mode to allow an electric power to be supplied from a secondary battery 7 to a load 6 at an output voltage managed by the DC/DC converter. Under such a condition, an electric power level appearing when a voltage level of the electric power to be supplied from the secondary battery to the load lies at a value greater than an open voltage level of the fuel cell stack 1. Next, the DC/DC converter 13 is operative in an electric power control mode to allow the electric power to be supplied from the secondary battery to the load at a managed electric power output. Then, a level of the electric power to be supplied to the load is detected with the DC/DC converter 13, which permits the electric power to be supplied from the secondary battery to the load at an electric power level less than a resulting detected electric power level.

7 Claims, 7 Drawing Sheets

FUEL CELL SYSTEM AND RELATED CONTROL METHOD

BACKGROUND OF THE INVENTION

The present invention relates to a fuel cell system adapted to start up a fuel cell stack, mainly using an electric power charged in a secondary battery, which is installed on a fuel cell powered vehicle whereby, through the use of an electric power output generated by the fuel cell stack and the electric power charged in the secondary battery, auxiliary units associated with the fuel cell stack for electric power generation are driven while producing a vehicle drive torque output.

An attempt has been made to start up a fuel cell system through the use of a technology wherein an electric power of a secondary battery other than a fuel cell stack is applied to an air compressor to allow oxidant gas to be supplied to the fuel cell stack to start up the same to be available for electric power generation whereupon a shift occurs from the secondary battery to the fuel cell stack made available for electric power generation to utilize the electric power output generated thereby as a driving power supply, as disclosed in Japanese Patent Application Laid-Open No. 2001-229943.

With such a fuel cell system, during a mode in which the electric power output of the secondary battery is supplied to the air compressor as the driving power supply, an output voltage and an electric power output are arbitrarily controlled by a DC/DC converter. The DC/DC converter is configured such that, during start-up operation, the electric power available from the secondary battery is made to be sufficiently higher than the electric power generated by the fuel cell stack that is adequately warmed up to be available for obtaining a desired electric power output. And, an output voltage of the electric power generated by the fuel cell stack is clamped at an output voltage level of the DC/DC converter, thereby precluding the electric power of the fuel cell stack from exceeding a certain desired level.

With such a fuel cell system, when discrimination is made the fuel cell stack is available for electric power generation, by decreasing the output voltage of the DC/DC converter while increasing the electric power to be supplied from the fuel cell stack, a source of electric power supply to the air compressor is made available to be smoothly shifted from the secondary battery to the fuel cell stack.

SUMMARY OF THE INVENTION

However, the above described fuel cell system takes the form of a structure wherein the electric power output to be supplied from the fuel cell stack to the load is managed merely in terms of the output voltage level of the DC/DC converter. For this reason, when fluctuation occurs in a characteristic of the fuel cell stack depending on temperatures, an electric current and voltage characteristic is apt to vary in a midcourse of warming up operation whereby even when the output voltage of the electric power generated by the fuel cell stack is clamped at the certain given level, a probability occurs where no desired voltage level is attained in the output of the fuel cell stack. Accordingly, with the above described fuel cell system, if the fuel cell stack is intended to operate in a certain range of an output in the midcourse of start-up operation, an issue arises in an inability of accurately managing the output of the fuel cell stack.

Therefore, the present invention has been completed with the above view in mind and has an object to provide a fuel cell system and a related control method which enable an electric power output to be taken out from a fuel cell stack in a stable fashion during start-up of the fuel cell stack.

According to a first aspect of the present invention, there is provided a fuel cell system comprising a fuel cell stack supplied with fuel gas and oxidant gas to generate an electric power which is supplied through a diode to a load installed on a fuel cell powered vehicle, a secondary battery by which an electric power is charged and discharged, an electric power converter connected to the fuel cell stack through the diode to convert an electric power level, charged in the secondary battery, and supplying a converted electric power to the load, and a controller operative to control the electric power converter in a way to allow a voltage level of the electric power, to be supplied from the secondary battery to the load, to lie at a value equal to or greater than an open voltage level of the fuel cell stack during start-up of the fuel cell stack, and to control the electric power converter in a way to allow an electric power level supplied to the load through the electric power converter to be detected for permitting the electric power to be supplied to the load from the secondary battery at an electric power level less than a detected electric power level.

According to a second aspect of the present invention, there is provided a method of controlling a fuel cell system, which has a fuel cell stack supplied with fuel gas and oxidant gas to generate an electric power which is supplied through a diode to a load installed on a fuel cell powered vehicle, and a secondary battery by which an electric power is charged and discharged, the method comprising converting a level of an electric power of the secondary battery to supply the electric power from the secondary battery to the load at a converted electric power level, controlling such that, when starting up the fuel cell stack, a voltage level of the electric power to be supplied from the secondary battery to the load lies at a value equal to or greater than an open voltage level of the fuel cell stack, and controlling such that the level of the electric power supplied to the load is detected to permit the electric power to be supplied to the load from the secondary battery at an electric power level less than a detected electric power level.

DETAILED DESCRIPTION OF THE PREFERRED EMBODIMENTS

Hereinafter, first to fourth embodiments of the present invention are described in detail with reference to the attached drawings.

First Embodiment

Structure of Fuel Cell System

Figure 1:
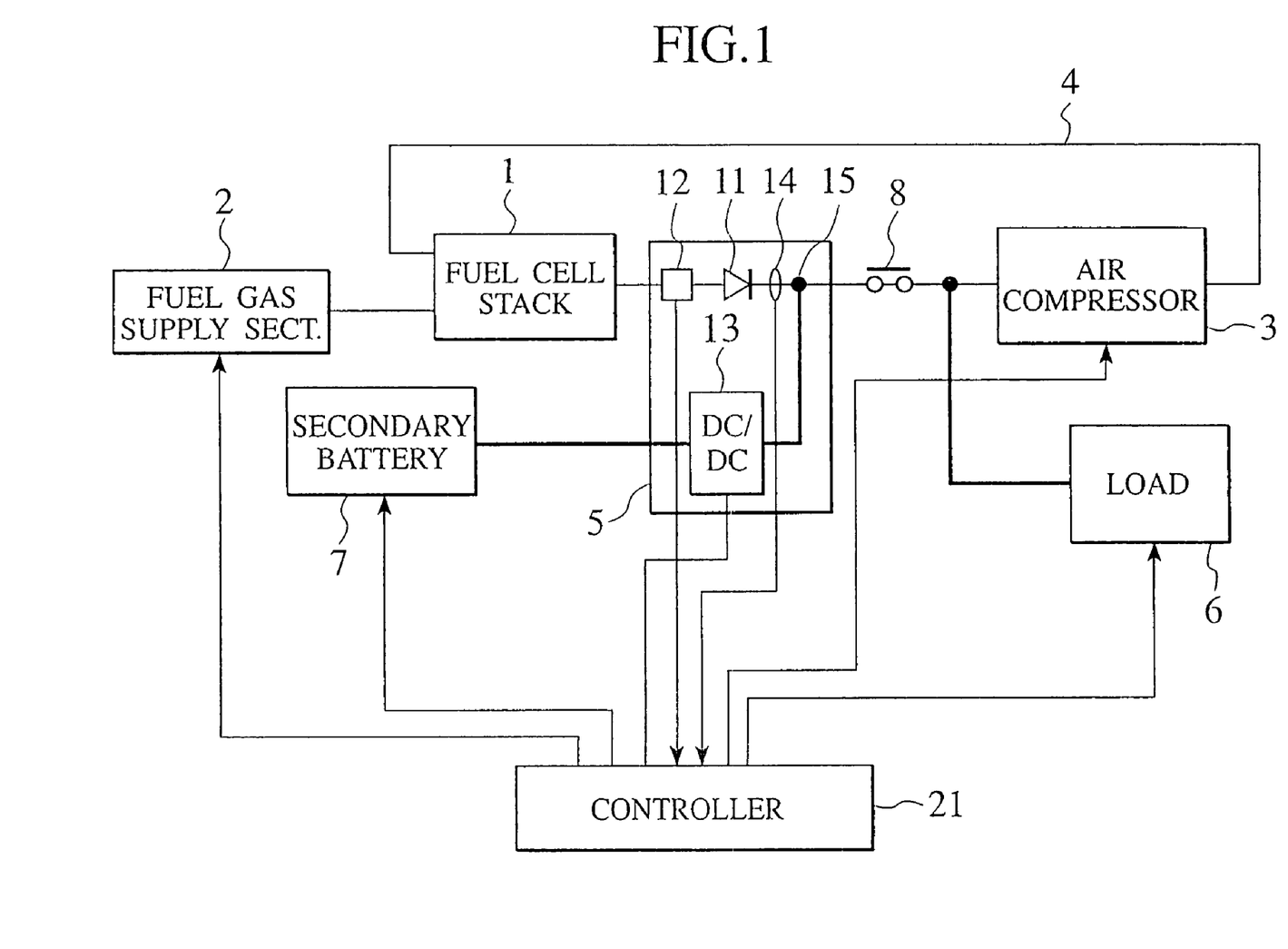
FIG. 1 is a block diagram illustrating a structure of a fuel cell system to which the present invention is applied.

The present invention is applied to a fuel cell system of a first embodiment constructed as shown in FIG. 1. The fuel cell system is installed on an electric vehicle with a drive motor installed thereon as a load to receive an electric power output to provide a drive torque output for the electric vehicle.

The fuel cell system includes a fuel cell stack 1 serving as a main power supply that is supplied with fuel gas and oxidant gas to generate the electric power output.

The fuel cell stack 1 is comprised of a plurality of stacks of fuel cell structural bodies, that are sandwiched by separators, each of which includes an air electrode and a hydrogen electrode between which a solid polymer electrolyte membrane is sandwiched. With the fuel cell system of the present embodiment, the fuel electrode of the fuel cell stack 1 is supplied with hydrogen gas, as fuel gas, and the oxidizing electrode is supplied with air, involving oxygen as oxidant gas, to generate the electric power output.

Fuel gas is supplied from a fuel gas supply section 2 to the fuel cell stack 1. The fuel gas supply section 2 stores fuel involving a large amount of hydrogen and, upon control through a controller section 21, the temperature and pressure of fuel gas are regulated.

Further, air is delivered under pressure by an air compressor 3 and is supplied to the fuel cell stack 1 through an air delivery pipe 4. Through control of a displacement stroke of the compressor 3 executed by the controller section 21, a flow rate of air to be supplied to the fuel cell stack 1 is controlled.

If the fuel cell stack 1 is supplied with fuel gas and air to generate the electric power output, upon control of the controller section 21, a power conditioner section 5 serves to allow the electric power output generated by the fuel cell stack 1 to be delivered to a load 6, such as a drive motor, and the electric compressor 3. Also, the power conditioner section 5 serves to allow an electric power, charged in a secondary battery 7, to be delivered to the compressor 3 and the load 6 depending upon a control status of the controller section 21, while serving to allow a regenerative electric power resulting from the load 6 to be charged into the secondary battery 7 during deceleration of the electric vehicle.

The secondary battery 7 is charged with the electric power, in excess thereof, resulting from the fuel cell stack 1 and the regenerative electric power resulting from the load 6 through the power conditioner section 5. The secondary battery 7 is so configured as to discharge the electric power, charged through control of the power conditioner section 5, at a higher voltage than that of the electric power output of the fuel cell stack 1. In an event that no adequate electric power output is generated by the fuel cell stack 1 at a rate insufficient to satisfy the electric power needed by units of a high power rate series, such as the load and the air compressor 3 which are driven at a high voltage, the power conditioner section 5 serves to permit the electric power, charged in the secondary battery 7, to be outputted for compensating inadequate electric power needed by the units of high power rate series.

The power conditioner section 5 is comprised of a diode 11 adapted to avoid flow of electric current to the fuel cell stack 1, a voltmeter 12 that detects the output voltage of the fuel cell stack 1, a DC/DC converter 13 that converts a level of a DC power, and an ammeter 14 that detects electric current that flows to the air compressor 3 and the load 6 through the diode 11. In this example, the voltmeter 12 detects a voltage at an anode of the diode 11, i.e., a voltage level applied across the diode 11 and the fuel cell stack 1.

The power conditioner section 5 is controlled by the controller section 21 such that, when permitting the electric power, charged in the secondary battery 7, to be supplied to the air compressor 3 and the load 6, the DC/DC converter 13 is operated so as to boost up the voltage level. Also, the power conditioner section 5 operates to allow the regenerative power resulting from the load 6 to be decreased to a voltage level, available to be charged to the secondary battery 7, whereupon the regenerative power is supplied to the secondary battery 7. Moreover, the voltage level detected by the voltmeter 12 and the current level detected by the ammeter 14 of the power conditioner section 5 is read in the controller section 21.

Further, with such a fuel cell system, a relay 8 is disposed between the power conditioner section 5, and the air compressor 3 and the load 6. The relay 8 is comprised of a suitable switch and is controlled to be turned on or turned off by the controller section 21 in a way to allow the electric power generated by the fuel cell stack 1 and the electric power, charged in the secondary battery 7, to be supplied to the air compressor 3 and the load 6 while permitting the regenerative power resulting from the load 6 to be delivered to the power conditioner section 5. The relay 8 functions as a power shut-off section of the fuel cell stack 1 and the secondary battery 7 with respect to the air compressor 3 and the load 6 and operates to shut off the supply of the electric power in a urgent status.

The controller section 21 is comprised of a ROM (Read On Memory) that internally stores therein a start-up control program, and a RAM (Random Access Memory) that provides a work area during control to execute the start-up control program for controlling various parts set forth above during a start-up mode. This allows the controller section 21 to read in sensor signals delivered from the voltmeter 12 and the ammeter 14 such that the output voltage and the output electric current of the fuel cell stack 1 are recognized. Moreover, the controller section 21 operates to recognize operating statuses of the fuel gas supply section 2, the air compressor 3, the load 6 and the relay 8 for thereby controlling operations of these various parts.

In addition, the controller section 21 is operative to controllably shift the DC/DC converter 13 depending on the output voltage of the fuel cell stack 1 and a charged status of the secondary battery 7 in such a way to allow boost-up operation to be achieved for boosting up the output voltage resulting from the secondary battery 7 to permit the electric power to be supplied to the load 6 and the air compressor 3, or to allow the output voltages resulting from the fuel cell stack 1, the load 6 and the air compressor 3 to be stepped down to a level to be supplied as the electric power to the secondary battery 7.

Further, the controller section 21 is operative to execute the start-up control program when in start-up operation of the fuel cell stack 1, thereby permitting boosting-up operation and step-down operation of the DC/DC converter 13 to be controlled. Also, a detailed content of this start-up control operation is described below.

Start-up Control Operation of Fuel Cell Stack 1

Next, an operational sequence of start-up control operation to be executed by the controller section when in start-up operation of the fuel cell stack 1 in the fuel cell system set forth above is described with reference to a flowchart of FIG. 2.

When in start-up control operation, operation subsequent to step S1 is commenced when start-up operation of the fuel cell system is initiated by a driver of a fuel cell powered vehicle.

First, the controller section 21 operates to set a control mode of the DC/DC converter 13 in a voltage control mode to allow the output voltage to be controlled for supply of the electric power to the air compressor 3 (step S1). This renders the controller section 21 operative to remain in a status available to arbitrarily control the voltage level (the output voltage level of the DC/DC converter 13) appearing at an output terminal of the DC/DC converter 13.

Figure 2:
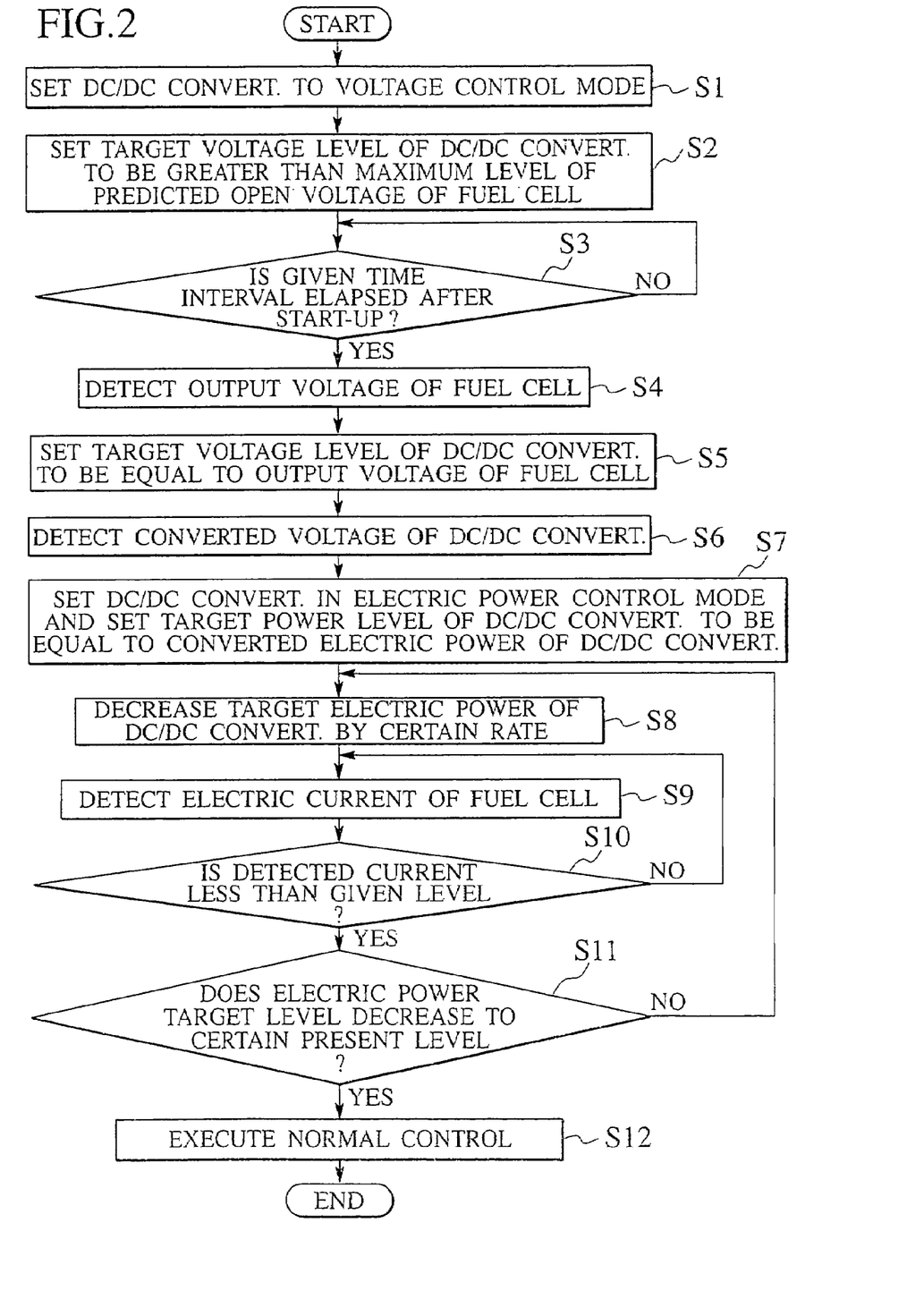
FIG. 2 is a flowchart illustrating an operation sequence of start-up control operation of the fuel cell system of a first embodiment to which the present invention is applied.
Figure 3:
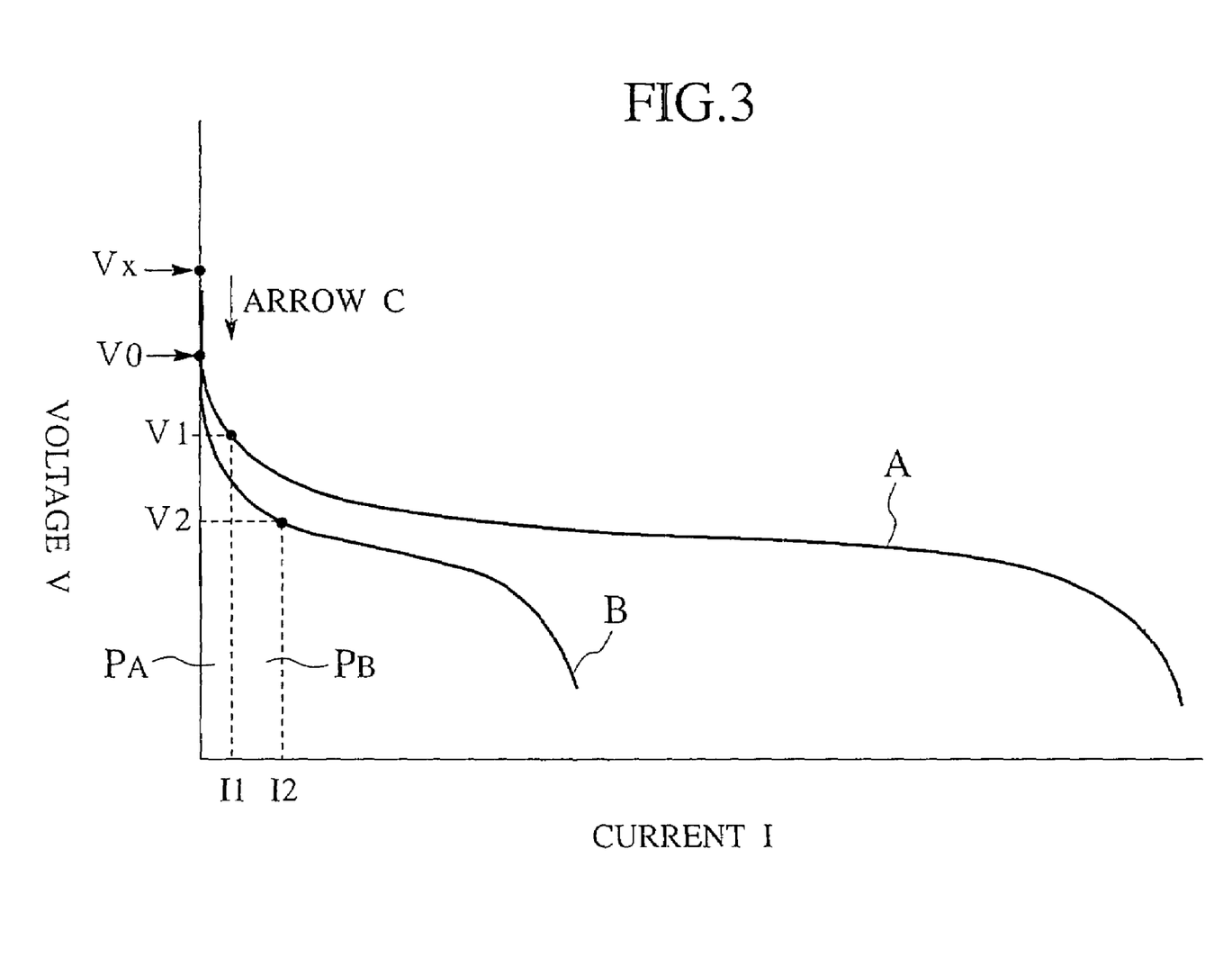
FIG. 3 is a view illustrating a voltage-current characteristic appearing when start-up of a fuel cell stack is completed and a voltage-current characteristic appearing when start-up of a fuel cell stack is not completed.

Subsequently, the controller section 21 operates to set a target value of the output voltage of the DC/DC converter 13 to a voltage level Vx greater than the maximum value of an open voltage level of V0 of the fuel cell stack 1 as shown in FIG. 3 (step S2). Thus, upon selection of the output voltage level of the DC/DC converter 13 to be equal to or greater than the open voltage level V0 of the fuel cell stack 1, the controller section 21 precludes the electric current not to flow from the fuel cell stack 1 to the air compressor 3.

That is, a voltage potential at a junction between a cathode of the diode 11 and the DC/DC converter 13 is selected to be greater than the maximum value of the open voltage level of the fuel cell stack 1. Also, since it is probable for the output voltage level of the DC/DC converter 13 to fluctuate depending upon the operating condition of the fuel cell stack 1, the output voltage level of the DC/DC converter 13 may be settled to a value slightly higher than the open voltage level of the fuel cell stack 1 in an actual practice. Moreover, the open voltage level V0 of the fuel cell stack 1 is preliminarily obtained through experimental teats, and use is made of a value that is retained in the controller section 21.

Under such a condition, no electric power is supplied from the fuel cell stack 1 to the air compressor 3 to which the electric power is supplied from the secondary battery 7 through the DC/DC converter 13. In step S2, also, the controller section 21 begins to operate the fuel gas supply section 2 using the electric power delivered from the secondary battery 7. This allows the controller section 21 to render the fuel cell stack 1 to remain in a status operative for electric power generation.

Moreover, when the charged state of the secondary battery 7 is detected prior to execution of operation in step S2, if discrimination is made that no ability exists for discharging the electric power at a rate greater than a certain given level, the controller section 21 operates to interrupt. start-up operation of the fuel cell system. This precludes the secondary battery 7 from being degraded. Here, operation to discriminate the charged status of the secondary battery 7 may be performed not only one time prior to execution of step S2 but may be necessarily executed prior to execution of step S2.

Next, after the output voltage level of the DC/DC converter 13 has been set to the value greater than the open voltage level, the controller section 21 discriminates to find whether the given time interval has elapsed (step S3). That is, the controller section 21 operates to control the air compressor 2 and the fuel gas supply section 2 in step S2 and discriminates to find whether the given time interval has elapsed after hydrogen gas and air has been supplied to the fuel cell stack 1 to commence start-up operation. By supplying hydrogen gas and air for the given time interval in such a way, the fuel cell system 1 operates to exhaust impurity gas from the fuel cell stack 1 while warming up the fuel cell stack 1.

And, when judgment has been made to find that the given time interval has elapsed from the time instant at which hydrogen gas and air have begun to be supplied to the fuel cell stack 1, the controller section 21 operates to read the sensor signal from the voltmeter 12 to measure the open voltage level of the fuel cell stack 1 (step S4). And, the controller section 21 operates to allow the open voltage level of the fuel cell stack 1, which is measured, to be set to a targeted output voltage level of the DC/DC converter 13 (step S5).

Thus, while the controller section 21 has operated to allow the open voltage level of the fuel cell stack 1, that is preliminarily predicted in step S2, to be set to the output voltage level that is targeted for the DC/DC converter 13, by executing operation in step S5 to allow an actual open voltage level of the fuel cell stack 1 to be set to the targeted output voltage level of the DC/DC converter 13 again, a control accuracy of subsequent operation is improved.

Consecutively, after the output voltage of the DC/DC converter 13 has been set in step S5 to be equal to the actual open voltage level of the fuel cell stack, the controller section 21 operates to detect the output voltage level and the output electric current level of the DC/DC converter 13 to detect an output power level of the DC/DC converter 13 (step S6). Here, in step S5, no electric power is outputted from the fuel cell stack 1, and a situation stands in which auxiliary electric power for the air compressor 3 necessary for start-up is supplied from the secondary battery 7. Then, upon detection of the electric power level converted by the DC/DC converter 13, the controller section 21 operates to identify the electric power consumed by the auxiliary units as a result of consumption during start-up of the fuel cell system.

When this takes place, in order to detect the electric power level converted by the DC/DC converter 13, the controller section 21 measures the output electric current level and the output voltage level flowing through the DC/DC converter 13 and multiplies these parameters. Also, the electric power consumed during start-up of the fuel cell system 1 is regarded to be substantially constant regardless of the status of the fuel cell stack 1, operation in step S5 is omitted, and a preliminarily determined electric power level may be used.

Subsequently, the controller section 21 shifts the control mode of the DC/DC converter 13 from the voltage control mode, set in step S1, to the electric power control mode in which the output power of the DC/DC converter 13 is controlled and supplied to the air compressor 3. Then, the target of the electric power level of the DC/DC converter 13 is set to be equal to the electric power level detected in step S6 (step S7). That is, due to an ability of the controller section 21 permitting the electric power, that is actually consumed, to be equal to the target level of the output power of the DC/DC converter 13, an auxiliary electric power is entirely supplied from the secondary battery 7.

Thus, by executing operations in steps S6 and S7, the fuel cell stack 1 is prevented from outputting the electric power generated by the fuel cell stack 1 and, at the same time, the electric power to be consumed for start-up of the fuel cell stack 1 is identified.

Next, the controller section 21 controls the DC/DC converter 13 such that the target level of the output power of the DC/DC converter 13 decrease at a given rate (step S8). This allows the electric power to be supplied from the secondary battery 7 to decrease such that the voltage potential at the junction 15 is below the open voltage of the fuel cell stack 1 to begin supply of electric power from the fuel cell stack 1 to the air compressor 3. Thus, when supply of the electric power from the fuel cell stack 1 to the air compressor 3 is begun, the output voltage of the fuel cell stack 1 decreases, resulting in an increase in the output electric current of the fuel cell stack 1.

Consecutively, an actual current level of the fuel cell stack 1 is detected from the ammeter 14 (step S9) and discrimination is made to find whether the detected current level is below the given value (step S10). If the output electric current level, that is detected, of the fuel cell stack 1 is found to be less than the given value, operation is routed to step S11, and if found to be greater than the given value, operation is routed back to step S9 where operation is waited until the current level of the fuel cell stack 1 is decreased to the given value.

Also, if operations in steps S9 and S10 are repeatedly executed plural times and no probability occurs in the output electric current level of the fuel cell stack 1 to drop below the given current level, then the controller section 21 discriminates that an abnormality occurs in the fuel cell system, whereupon the fuel cell system may be shut down.

Here, the term "given current level" refers to a level that is determined through utilization of the presence of a difference in output electric current levels of the fuel cell stack 1 between a voltage-current characteristic (characteristic A in FIG. 3) of the fuel cell stack 1, wherein when permitting the output electric current level of the DC/DC converter 13 to decrease in step S8, even if the same electric power levels as represented by $(PA(=V_1*I_1)=PB(V_2*I_2))$ appear as shown in FIG. 3, the fuel cell stack 1 is supplied with gases at higher flow rates than required while at the same time the fuel cell stack 1 remains at a sufficiently high temperature with the fuel cell stack 1 remaining in a completed start-up condition, and a voltage-current characteristic (characteristic B in FIG. 3) of the fuel cell stack 1 wherein the fuel cell stack 1 is supplied with gases at less flow rates than required or the fuel cell stack 1 is not elevated to the sufficiently high temperature with the fuel cell stack 1 remaining in a non-completed start-up condition.

That is, when permitting the output electric current level of the DC/DC converter 13 to decrease, the presence of completion in start-up of the fuel cell stack 1 causes the output voltage of the fuel cell stack 1 to lie at a level of $V_1$ and the output electric current to lie at a level of $I_1$ (see the characteristic A). On the contrary, even in the presence of the same electric power levels, the absence of completion of start-up of the fuel cell stack 1 causes the output voltage of the fuel cell stack 1 to lie at a level of $V_2$ lower than $V_1$ and the current level $I_1$ to lie at a level greater than $I_2$.

Thus, the electric current level of the fuel cell stack 1, with no completion in start-up, becomes greater than that appearing when start-up has been completed. Through the use of such a voltage-current characteristic of the fuel cell stack 1, the controller section 21 determines a threshold value of the electric current level of the fuel cell stack 1 in terms of the electric power level of the DC/DC converter 13 subsequent to a phase in which the output electric current level of the DC/DC converter 13 is decreased in step S8, thereby permitting discrimination to be made to find whether the fuel cell stack 1 achieves and maintains a given performance.

When discrimination is made that the electric current level detected in step S9 is less than a given electric current level (step S10), then judgment is made that the fuel cell stack 1 achieves and maintains the given performance whereupon further discrimination is made to find whether the output power to be targeted in the DC/DC converter 13 is decreased to a preset value (step S11). If the output power is found to be decreased to the preset value, operation for the control mode of the DC/DC converter 13 is routed back to the voltage control mode, thereby permitting the fuel cell stack 1 to remain in the normal electric power control mode and operation is terminated (step S12).

On the contrary, when discrimination is made that the electric current level detected in step S9 is not less than the given level (step S10), then operation is routed back to step S9 and operations in step S9 and step S10 are repeatedly executed whereupon if the fuel cell stack 1 achieves the given performance, operations subsequent to step S11 are executed.

When discrimination is made in step S11 that the output power to be targeted in the DC/DC converter 13 is not decreased to the preset value, operation is routed back to step S8 and operations subsequent to step S8 are repeatedly executed.

Also, while it is preferable for the preset level for judgment in step S11 to be set to a value of "0" when shifting a source, from which electric power is supplied to the load 6, from the secondary battery 7 to the fuel cell stack 1, the preset level may be set to a given value greater than 0 for the purpose of shifting operation to normal control within a short length of time.

Further, during normal control in step S12, a situation stands for the control mode of the DC/DC converter 13 to be returned to the voltage control mode. This is due to the fact that, when regenerative braking of the vehicle takes place to allow a regenerative electric power to be resulted from the load 6, a probability occurs for the voltage appearing at the DC/DC converter 13 at the terminal closer to the load 6 to increase and, thus, the voltage control mode is intended to avoid such an increase in the voltage.

Figure 4:
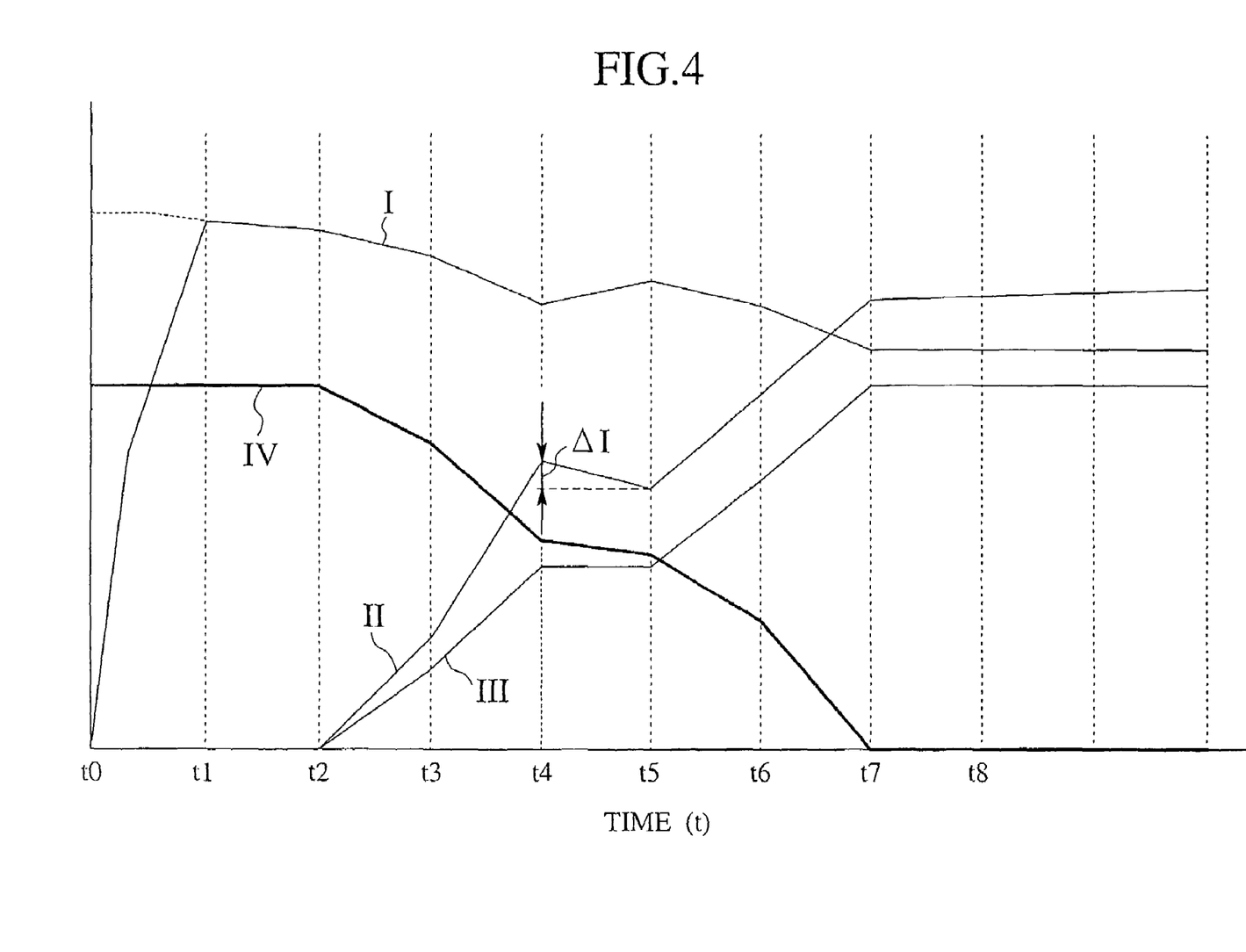
FIG. 4 is a view illustrating variations in output voltage, output electric current and output electric power of the fuel cell stack, appearing when start-up control operation is executed in the fuel cell system to which the present invention is applied, and an output electric power of az secondary battery.

By performing such start-up control operation, as shown in FIG. 4, the output voltage (on a characteristic I) and the output electric current (on a characteristic II) of the fuel cell stack 1, the output power (on a characteristic III) of the fuel cell stack 1 and the output power (on a characteristic IV) of the secondary battery 2 are caused to vary.

By executing operations in steps S1 and step S2 to begin start-up control operation at time t0, the control unit 21 allows the output voltage of the secondary battery 7 to be set to a level higher than the maximum level of the open voltage of the fuel cell stack 1 at time t0 thereby to permit the secondary battery 7 to provide the electric power output (on a characteristic IV). This permits the air compressor 3 and the fuel gas supply section 2 to be controllably driven with the electric power output delivered from the secondary battery 7 so as to begin supply of hydrogen gas and air to the fuel cell stack 1 whereupon the output voltage of the fuel cell stack 1 is raised to the open voltage level for a time interval between times t0 and t1 (on the characteristic I).

And, upon execution of operations in step S3 to step S7 to allow the control mode of the DC/DC converter 13 to be set to the electric power control mode while permitting operation in step S8 to be executed at time t2 on to cause the output power level of the DC/DC converter 13 to decrease such that the output power level of the secondary battery 7 decrease (on the characteristic IV), operation begins to take out the electric power output from the fuel cell stack 1. When this takes place, the output voltage of the fuel cell stack 1 decreases (on the characteristic I), and the output electric current of the fuel cell stack 1 increases (on the characteristic II).

Here, under a situation where the output electric current of the fuel cell stack 1 appearing between times t2 and t3 is detected to be less than the given current level whereupon the electric power output of the secondary battery 7 is further decreased again, if the output electric current of the fuel cell stack 1, that has increased in the time interval between times t3 and t4, becomes larger in magnitude than an increased range between times t2 and t3 by Δ1 and no discrimination is made in step S10 that the output electric current of the fuel cell stack 1 is less than the given current level, operations in step S8 and step S9 are repeatedly executed.

By so doing, during a time interval between time t4 and time t5, the electric power output to be taken out from the secondary battery 7 through the DC/DC converter 13 is kept constant, and the fuel cell stack 1 remains in a standby condition until the fuel cell stack 1 achieves the given performance. And, when the output voltage of the fuel cell stack 1 is raised while the output electric current of the fuel cell stack 1 decreases, operation is repeated again so as to lower the electric power output of the secondary battery 7 again. Then, at time t7, if the electric power output of the secondary battery 7 reaches to a value of 0 (the preset level in step S11), this phase represents that the source of electric power to be supplied to the air compressor 3 has been completely switched over from the secondary battery 7 to the fuel cell stack 1, and operation is returned to the voltage control mode again to be shifted in the normal control.

As previously described in detail, with the fuel cell system of the first embodiment, during start-up operation of the fuel cell stack 1, the output voltage of the DC/DC converter 13 is selected to be higher than the open voltage of the fuel cell stack 1 whereupon the output electric current of the DC/DC converter 13 is detected to allow the DC/DC converter 13 to assume the electric power control mode so as to decrease the electric power to be supplied to the load 6 and the cir compressor 3, thereby permitting to begin the supply of the electric power output from the fuel cell stack 1. Accordingly, through utilization of only simplified electric power control, the source of electric power to be supplied to the load 6 and the air compressor 3 can be switched over from the secondary battery 7 to the fuel cell stack 1, enabling the electric power output to be taken out from the fuel cell stack 1 in a stable manner during start-up operation.

Further, with such a fuel cell system, when in operation of the DC/DC converter 13 in the voltage control mode, first, the output voltage of the DC/DC converter 13 is selected to be greater than the maximum value of the open voltage of the fuel cell stack 1 and, subsequently, the actual open voltage of the fuel cell stack 1 is rendered to be equal to the output voltage of the DC/DC converter 13 so as to permit switch over to take place to the electric power control mode responsive to actually consumed electric power. Accordingly, it becomes possible to improve an accuracy of electric power control in the electric power mode and, additionally, to remove excess of or short of electric power during switch over between the sources of electric power supply, thereby enabling excess electric power to be precluded from being taken out from the fuel cell stack 1.

Furthermore, with such a fuel cell system, in an event that when operation is made to decrease the electric power output of the DC/DC converter 13, the output electric current of the fuel cell stack 1 is detected to be greater than the given current level, the fuel cell stack 1 remains in the standby status until the output electric current of the fuel cell stack 1 does not exceed the given current level. As a result of such control, the electric power output to be taken out from the fuel cell stack 1 can be gradually increased with the output electric current of the fuel cell stack 1 being managed. As a consequence, with such a fuel cell system, even during cold start-up prior to the fuel cell stack 1 being fully warmed up, it becomes possible to preclude the electric power output from being taken out at a rate in excess of a performance of the fuel cell system 1.

Here, when permitting the output electric power of the DC/DC converter 13 to drop, it is probable for a way of decrease in the output voltage of the fuel cell stack 1 and a way of increase in the output electric current of the fuel cell stack 1 to differ depending upon the status of the fuel cell stack 1. There is a tendency wherein if the temperature of the fuel cell stack 1 remains at a low level, the output voltage of the fuel cell stack 1 drops to a lower value, with the same electric power being outputted, than that appearing when the fuel cell stack 1 has been fully warmed up and the output electric current level increases. In contrast, with the fuel cell system, since the fuel cell stack 1 is rendered to remain in the standby condition when the output electric current of the fuel cell stack 1 increases beyond the given value, deterioration in performance of the fuel cell stack 1 can be avoided.

Second Embodiment

Next, a fuel cell system of a second embodiment is described. Also, the same component parts as those of the first embodiment set forth above bear the same reference numerals and the same step numbers, and details of these components are herein omitted for simplicity. Moreover, the second embodiment has the same structure as that of the first embodiment, and a detail of such a structure is herein omitted for simplicity.

Figure 5:
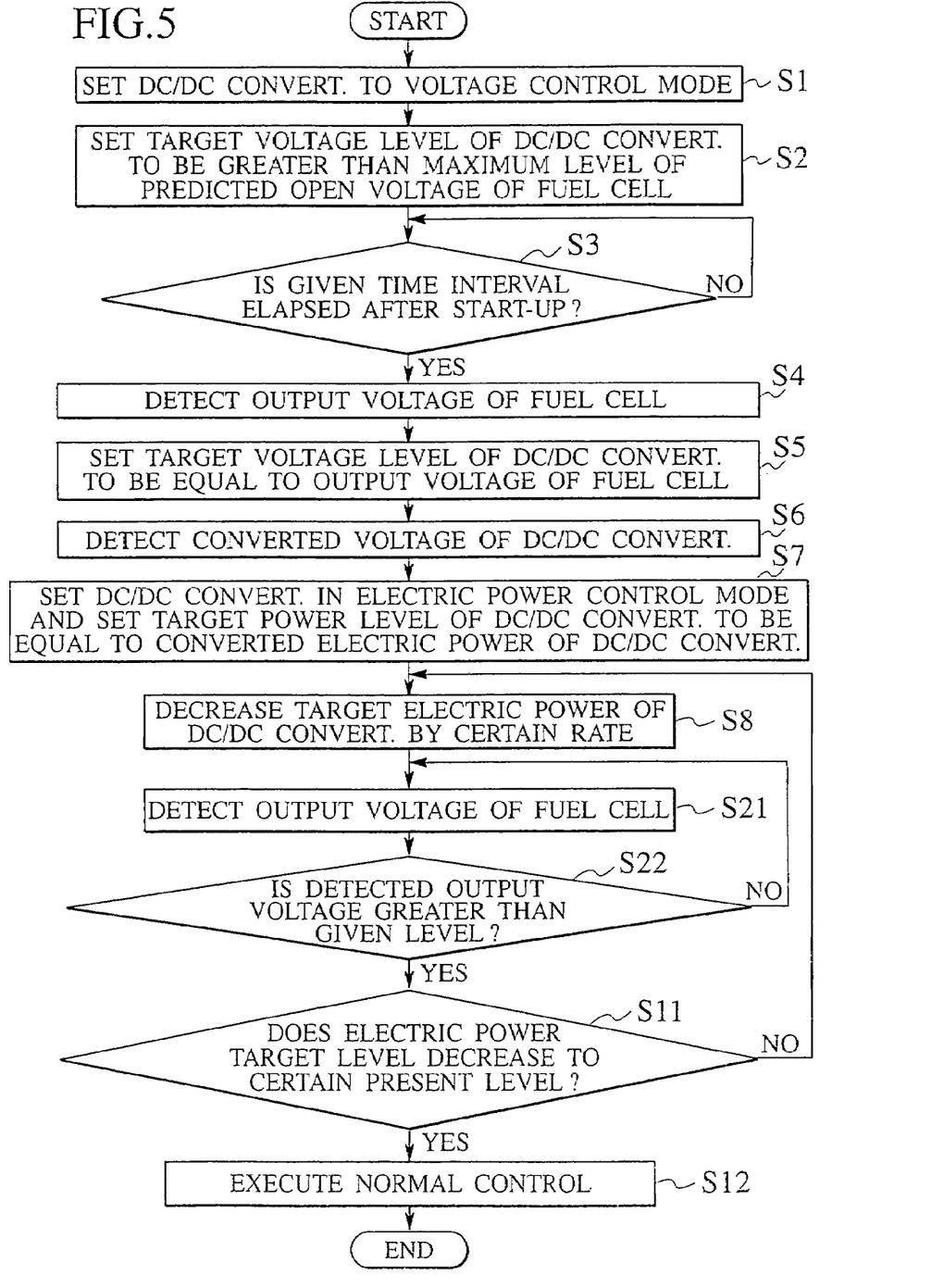
FIG. 5 is a flowchart illustrating an operation sequence of start-up control operation of a fuel cell system of a second embodiment to which the present invention is applied.

The fuel cell system of the second embodiment executes start-up control operation as shown in FIG. 5 such that, in step S21 subsequent to achievement of the DC/DC converter 13 in reduction of the target value of the output electric power executed in step S8, the controller section 21 retrieves the sensor signal from the voltmeter 12 and detects the output voltage of the fuel cell stack 1.

Then in step S22, discrimination is made by the controller section 21 to find whether the output voltage of the fuel cell stack 1 detected in step S21 exceeds the given voltage level. If the output voltage level of the fuel cell stack 1 is found to exceed the given voltage level, operation proceeds to operation in step S11, and if the output voltage level of the fuel cell stack 1 is found to be less than the given voltage level, the fuel cell stack 1 is rendered to remain in the standby condition until the fuel cell stack 1 achieves the given performance.

Here, the "given voltage level" is determined in consideration of the characteristic A and the characteristic B in FIG. 2 similar to the given current level in step S9 which has been set forth above. And, the controller section 21 is so configured as to determine the threshold value for the voltage level of the fuel cell stack 1 in compliance with the electric power level of the DC/DC converter 13 subsequent to operation in reduction of the output electric current level of the Dc/DC converter 13 in step S8, thereby allowing discrimination to be made to find whether the fuel cell stack 1 achieves and maintains the given performance.

With such a fuel cell system adapted to perform start-up control operation, through management of the voltage of the fuel cell stack 1 appearing when taking out the electric power from the fuel cell stack 1, it becomes possible for the electric power to be generated by the fuel cell stack 1 without exceeding the performance thereof even on cold start-up prior to the fuel cell stack 1 being fully warmed up.

Further, with such a fuel cell system, since the fuel cell stack 1 is rendered to remain in the standby condition in the presence of a phase where the output voltage of the fuel cell stack 1 drops below the given value, degradation in performance of the fuel cell stack 1 can be avoided.

Third Embodiment

Next, a fuel cell system of a third embodiment is described. Also, the same component parts as those of the above embodiments set forth above bear the same reference numerals and the same step numbers, and details of these components are herein omitted for simplicity.

Figure 6:
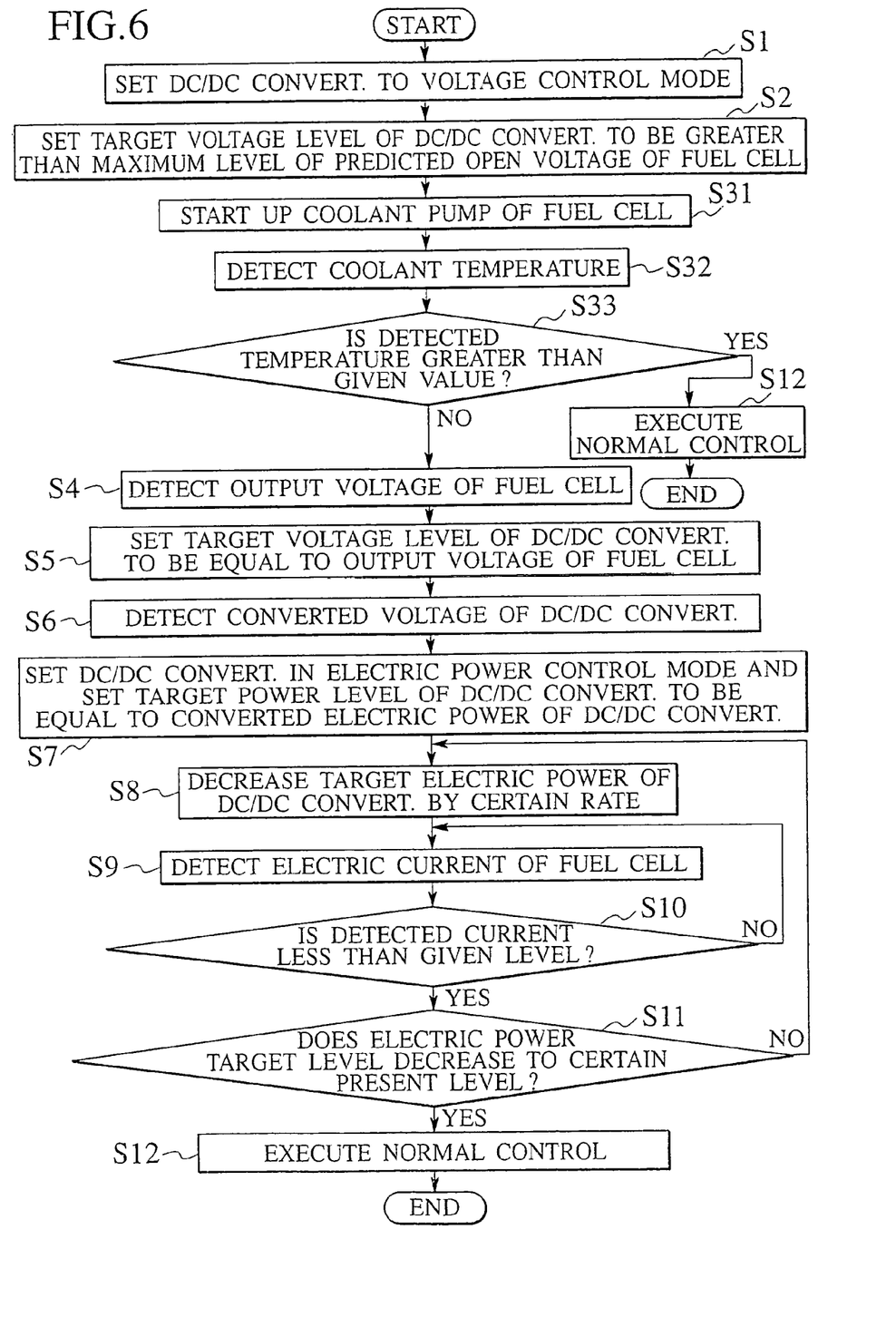
FIG. 6 is a flowchart illustrating an operation sequence of start-up control operation of a fuel cell system of a third embodiment to which the present invention is applied.

The fuel cell system of the third embodiment features that, during switch over of the control mode of the DC/DC converter 13 from the voltage control mode to the electric power control mode, if the temperature of the fuel cell stack 1 is detected and it is discriminated that the fuel cell stack 1 performs the given performance, then operation is executed to be directly shifted to normal control.

During start-up control operation of such a fuel cell system, as shown in FIG. 6, the DC/DC converter 13 is controlled in the voltage control mode in step S2 and, subsequent to the presence of a capability for supplying the electric power to the load 6, operation is executed to commence supply of hydrogen gas and air to the fuel cell stack 1.

Then in step S31 subsequent to operation in step S2, the controller section 21 is operative to drive a coolant pump (not shown) at a given drive rate to allow coolant to be circulated in the fuel cell stack 1. Thus, by permitting coolant to circulate through the fuel cell stack 1, temperature distribution of coolant is designed to be uniform to some extent, providing a status available for the temperature of the fuel cell stack 1 to be identified from the coolant temperature. Also, the drive rate of the coolant pump may be selected to lie in an extent to preclude the occurrence of a non-uniformity in temperature distribution in a coolant circulation system, such as a coolant delivery conduit or a coolant flow passage, inside the fuel stack 1, and may be selected at a rate to provide an extremely small flow rate because of the absence of heat buildup in the fuel cell stack 1.

In succeeding step S32, the controller section 21 retrieves the sensor signal from a coolant temperature sensor (not shown) and detects a coolant temperature whereupon discrimination is made to find whether the coolant temperature detected in step S33 exceeds a given value.

When discrimination is made that the detected coolant temperature exceeds the given value and the fuel cell stack 1 is warmed up whereby the electric power can be adequately taken out from the fuel cell stack 1, operation proceeds to step S12 to shift operation to normal control whereupon operation is terminated.

On the contrary, when discrimination is made that the detected coolant temperature does not exceed the given value and the fuel cell stack 1 remains in an insufficient warmed up condition whereby it is hard for the electric power to be adequately taken out from the fuel cell stack 1, operations subsequent to step S4 are executed. This allows the output electric power of the DC/DC converter 13 to be gradually decreased, thereby permitting the electric power being progressively taken out from the fuel cell stack 1.

With such a fuel cell system to perform start-up control operation, in an event that the fuel cell stack 1 is adequately warmed up immediately after start-up of the fuel cell stack 1, since operation can be executed to be shifted to normal control without executing operations in step S4 to step S11, start-up control operation of the fuel cell stack 1 can be performed in a short time period.

Moreover, while in step S31 and step S32, operation has been described to predict the temperature of the fuel cell stack 1 responsive to the coolant temperature, an alternative may be carried out to provide a sensor that directly detects the temperature of the fuel cell stack 1 to allow a value detected by such a sensor to be utilized.

Fourth Embodiment

Next, a fuel cell system of a fourth embodiment is described. Also, the same component parts as those of the above embodiments set forth above bear the same reference numerals and the same step numbers, and details of these components are herein omitted for simplicity.

Figure 7:
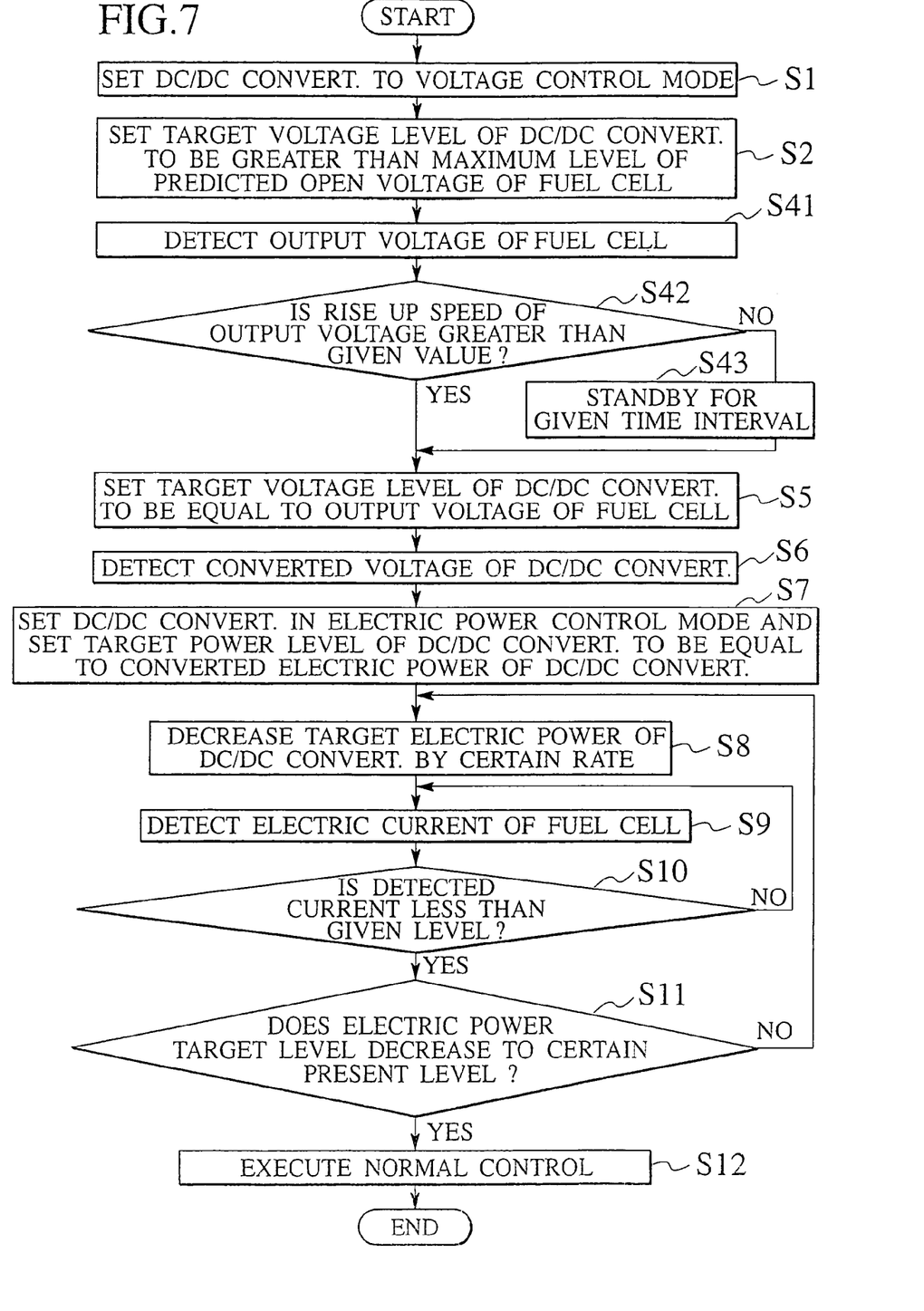
FIG. 7 is a flowchart illustrating an operation sequence of start-up control operation of a fuel cell system of a fourth embodiment to which the present invention is applied.

The fuel cell system of the fourth embodiment features that, when switching over the control mode of the DC/DC converter 13 from the voltage control mode to the normal electric power control mode, a way of rise up of the open voltage of the fuel cell stack 1 is detected to allow the DC/DC converter 13 to be switched over to the electric power control mode to permit a timing, at which the electric power is taken out from the fuel cell stack 1, to be controlled in dependence on the way of rise up of the detected opening voltage level of the fuel cell stack 1.

With such a fuel cell system, as shown in FIG. 7, in step S41 subsequent to start-up control operation in step S2 wherein hydrogen gas and air are supplied to the fuel cell stack 1, the controller section 21 retrieves the sensor signal from the voltmeter 12 and measures the output voltage of the fuel cell stack 1.

In consecutive step S42, the control unit 21 executes discrimination to find how the output voltage of the fuel cell stack 1 detected in step S42 rises up. When this takes place, the controller section 21 may execute comparison between a time constant, in which the output voltage of the fuel cell stack 1 rises up, and a time constant that is preliminarily determined on calculation, calculation between a measured time interval, in which the output voltage of the fuel cell stack 1 reaches a voltage level closer to the open voltage level, and a preliminarily determined preset time interval, or comparison between a calculated variant value of the detected voltage at a certain time and a voltage variant value that is preliminarily determined.

And, the controller section 21 executes discrimination responsive to the way, in which the output voltage of the fuel cell stack 1 detected in step S41 rises up, to find whether a rise up speed of the output voltage exceeds a given speed whereupon, in the presence of discrimination with the rise up speed of the output voltage exceeding the given speed, discrimination is executed that the fuel cell stack 1 operates to generate the electric power output during start-up in a stable fashion and operations are shifted to operations subsequent to step S5.

In contrast, if discrimination is made that the rise up speed of the output voltage does not exceed the given speed, operation proceeds to step S43 and, for a given time interval, the electric power is supplied from the secondary battery 7 to allow the fuel cell stack 1 to stand in the standby condition under a condition available to be supplied with hydrogen gas and air whereupon operation proceeds to step S5.

With such a fuel cell system, if supply of hydrogen gas and air to the fuel cell stack 1 is commenced and the way of rise up of the open voltage, when the open voltage of the fuel cell stack 1 increases, is slower than the given speed, then operation is executed to delay the timing at which the electric power can be taken out from the fuel cell stack 1, thereby enabling operation of the fuel cell stack 1 to be stabilized.

The entire content of Japanese Application No. P2002-307216 with a filing date of Oct. 22, 2002 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A fuel cell system comprising:
   a fuel cell stack supplied with fuel gas and oxidant gas to generate an electric power which is supplied through a diode to a load installed on a fuel cell powered vehicle;
   a secondary battery by which an electric power is charged and discharged;
   an electric power converter connected to the fuel cell stack through the diode to convert an electric power, charged in the secondary battery, and supply a converted electric power to the load; and
   a controller that controls the electric power converter under two control modes during a start-up of the fuel cell stack, the two control modes including: a first control mode to set a target voltage level of an electric power to be supplied to the load from the secondary battery equal to or greater than an open voltage level of the fuel cell stack; and a second control mode to set a target electric power level of an electric power to be supplied to the load from the secondary battery equal to an electric power level of an electric power being supplied to the load from the secondary battery, to perform a reduction of the target electric power level at a given rate, and to interrupt the reduction of the target electric power level when one of the following conditions is satisfied: (1) an output electric current level of the fuel cell stack increases beyond a first threshold; and (2) an output voltage level of the fuel cell stack drops below a second threshold, the first and second thresholds being predetermined based on a voltage-current characteristic during the start-up of the fuel cell stack to a completion of the start-up.

2. The fuel cell system according to claim 1, wherein when a temperature of the fuel cell stack is less than a given value under the first control mode, the controller is adapted to control the electric power converter under the second control mode.

3. The fuel cell system according to claim 1, wherein the controller is adapted to measure an output voltage level of the fuel cell stack under the first control mode and control a timing of the reduction under the second control mode depending on rise-up condition of the output voltage level of the fuel cell stack.

4. The fuel cell system according to claim 3, wherein when the rise-up condition of a output voltage level of the fuel cell stack is slower than a predetermined rise-up condition, then the controller is adapted to delay the timing of the reduction under the second control mode, in order to stabilize the fuel cell stack.

5. The fuel cell system according to claim 1, wherein the controller is adapted to keep the fuel cell stack in a stand-by state when one of the conditions (1) and (2) is satisfied.

6. A fuel cell system comprising:
   a fuel cell stack supplied with fuel gas and oxidant gas to generate an electric power which is supplied through a diode to a load installed on a fuel cell powered vehicle;
   a secondary battery by which an electric power is charged and discharged;
   electric power converting means connected to the fuel cell stack through the diode and converting an electric power charged in the secondary battery, supplying to the load; and
   control means that controls the electric power converter means under two control modes during start up of the fuel cell stack, the two control modes including: a first control mode to set a target voltage level of an electric power to be supplied to the load from the secondary battery equal to or greater than an open voltage level of the fuel cell stack; and a second control mode to set a target electric power level of an electric power to be supplied to the load from the secondary battery equal to an electric power level of an electric power being supplied to the load from the secondary battery, to perform a reduction of an the target electric power level at a given rate. ,and to interrupt the reduction of the target electric power level when one of the following conditions is satisfied: (1) an output electric current level of the fuel cell stack increases beyond a first threshold and (2) an output voltage level of the fuel cell stack drops below a second threshold ,the first and second thresholds being predetermined based on a voltage-current characteristic during the start-up of the fuel cell stack to a completion of the start-up.

7. A method of controlling a fuel cell system, which has a fuel cell stack supplied with fuel gas and oxidant gas to generate an electric power which is supplied through a diode to a load installed on a fuel cell powered vehicle, and a secondary battery by which an electric power is charged and discharged, the method comprising:
   converting an electric power of the secondary battery to supply to the load ;
   controlling the fuel cell system such that, when starting up the fuel cell stack, a voltage level of an electric power to be supplied from the secondary battery to the load is set at a value equal to or greater than an open voltage level of the fuel cell stack; setting a target electric power level of an electric power to be supplied from the secondary battery to the load equal to an electric power level of an electric power being supplied from the secondary battery to the load;
   controlling the fuel cell system to perform a reduction of the target electric power level at a given rate; and
   interrupting the reduction of the target electric power level when one of the following conditions is satisfied: (1) an output electric current of the fuel cell stack increases beyond a first threshold; and (2) an output voltage of the fuel cell stack drops below a second threshold, the first and second thresholds being predetermined based on a voltage-current characteristic during the start-up of the fuel cell stack to a completion of the start-up.

* * * * *